United States Patent
Shastri et al.

(10) Patent No.: US 9,213,152 B2
(45) Date of Patent: Dec. 15, 2015

(54) RELEASABLE FIBER CONNECTOR FOR OPTO-ELECTRONIC ASSEMBLIES

(71) Applicant: Cisco Technology, Inc., San Jose, CA (US)

(72) Inventors: Kalpendu Shastri, Orefield, PA (US); Soham Pathak, Allentown, PA (US); John Fangman, Leesport, PA (US); Vipulkumar Patel, Breinigsville, PA (US); Kishor Desai, Fremont, CA (US); Ravinder Kachru, Los Altos Hills, CA (US)

(73) Assignee: Cisco Technology Inc., San Jose, CA (US)

( * ) Notice: Subject to any disclaimer, the term of this patent is extended or adjusted under 35 U.S.C. 154(b) by 73 days.

(21) Appl. No.: 13/737,029

(22) Filed: Jan. 9, 2013

(65) Prior Publication Data

US 2013/0182996 A1    Jul. 18, 2013

Related U.S. Application Data

(60) Provisional application No. 61/584,447, filed on Jan. 9, 2012.

(51) Int. Cl.
  *G02B 6/42* (2006.01)
  *G02B 6/12* (2006.01)
  *G02B 6/38* (2006.01)

(52) U.S. Cl.
  CPC .. *G02B 6/42* (2013.01); *G02B 6/12* (2013.01); *G02B 6/3886* (2013.01); *G02B 6/4292* (2013.01); *G02B 6/4214* (2013.01); *G02B 6/4259* (2013.01); *Y10T 29/49155* (2015.01)

(58) Field of Classification Search
  CPC ........................................................ G02B 6/3886
  USPC .................................................................. 385/57
  See application file for complete search history.

(56) References Cited

U.S. PATENT DOCUMENTS

| | | | |
|---|---|---|---|
| 4,422,652 A | 12/1983 | Shapiro et al. |
| 6,318,909 B1 | 11/2001 | Giboney et al. |
| 6,736,553 B1 | 5/2004 | Stiehl et al. |
| 7,289,701 B2 | 10/2007 | Lam et al. |
| 7,366,380 B1 | 4/2008 | Peterson et al. |
| 7,623,743 B2 | 11/2009 | Furuyama |
| 7,729,581 B2 | 6/2010 | Rolston et al. |
| 2003/0031431 A1 | 2/2003 | Kunkel et al. |
| 2005/0191003 A1 | 9/2005 | Yorks et al. |

(Continued)

*Primary Examiner* — Ryan Lepisto
*Assistant Examiner* — Erin Chiem
(74) *Attorney, Agent, or Firm* — Patterson & Sheridan, LLP (57) ABSTRACT

An apparatus for providing releasable attachment between a fiber connector and an opto-electronic assembly, the opto-electronic assembly utilizing an interposer substrate to support a plurality of opto-electronic components that generates optical output signals and receives optical input signals. An enclosure is used to cover the interposer substrate and includes a transparent region through which the optical output and input signals pass unimpeded. A magnetic connector component is attached to the lid and positioned to surround the transparent region, with a fiber connector for supporting one or more optical fibers magnetically attached to the connector component by virtue of a metallic component contained in the fiber connector. This arrangement provides releasable attachment of the fiber connector to the enclosure in a manner where the optical output and input signals align with the optical fibers in the connector.

17 Claims, 11 Drawing Sheets

(56) References Cited

U.S. PATENT DOCUMENTS

| | | | |
|---|---|---|---|
| 2007/0223865 A1* | 9/2007 | Lu et al. ......................... 385/90 |
| 2010/0027941 A1* | 2/2010 | Stewart et al. .................. 385/57 |
| 2010/0232746 A1* | 9/2010 | Hino et al. ...................... 385/31 |
| 2012/0155803 A1 | 6/2012 | Benjamin et al. |

* cited by examiner

RELEASABLE FIBER CONNECTOR FOR OPTO-ELECTRONIC ASSEMBLIES

CROSS-REFERENCE TO RELATED APPLICATIONS

This application claims the benefit of U.S. Provisional Application No. 61/584,447 filed Jan. 9, 2012.

TECHNICAL FIELD

The present disclosure relates to a releasable fiber connector, including a magnetic connector component, for use with integrated opto-electronic assemblies.

BACKGROUND

Many types of opto-electronic modules comprise a number of separate optical and electrical components that require precise placement relative to one another. A silicon (or glass) carrier substrate (sometimes referred to as an interposer) is generally used as a support structure to fix the location of the components and may, at times, also provide the desired electrical or optical signal paths between selected components. As the components are being assembled on the interposer, active optical alignment may be required to ensure that the integrity of the optical signal path is maintained. In most cases, a "lid" needs to be placed over and attached to the populated interposer component, with one or more optical fibers coupled to the interposer.

The optical input/output paths are generally maintained along a common plane, with a fiber array containing several individual fibers used as the optical signal paths between the interposer and the external communication environment. Most configurations utilize a fiber array connector that is permanently attached to the interposer housing, since the need to reliably maintain optical alignment is a primary concern.

There are situations, however, where it would be preferable to utilize a releasable fiber connector arrangement that maintains optical alignment when repeatedly detached and re-attached to the interposer housing.

BRIEF DESCRIPTION OF THE DRAWINGS

The accompanying drawings, which are incorporated in and constitute a part of this disclosure, illustrate various embodiments of the present invention. In the drawings.

DESCRIPTION OF EXAMPLE EMBODIMENTS

Overview

An apparatus for providing releasable attachment between a fiber connector and an opto-electronic assembly, the opto-electronic assembly utilizing an interposer substrate to support a plurality of opto-electronic components that generate optical output signals and receive optical input signals. An enclosure is used to cover the interposer substrate and includes a transparent region through which the optical output and input signals pass unimpeded. A magnetic connector component is attached to the enclosure and positioned to surround the transparent region, with a fiber connector for supporting one or more optical fibers magnetically attached to the connector component by virtue of a metallic component contained in the fiber connector. This arrangement provides releasable attachment of the fiber connector to the enclosure in a manner where the optical output and input signals align with the optical fibers in the connector.

Example Embodiments

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Figure 1:
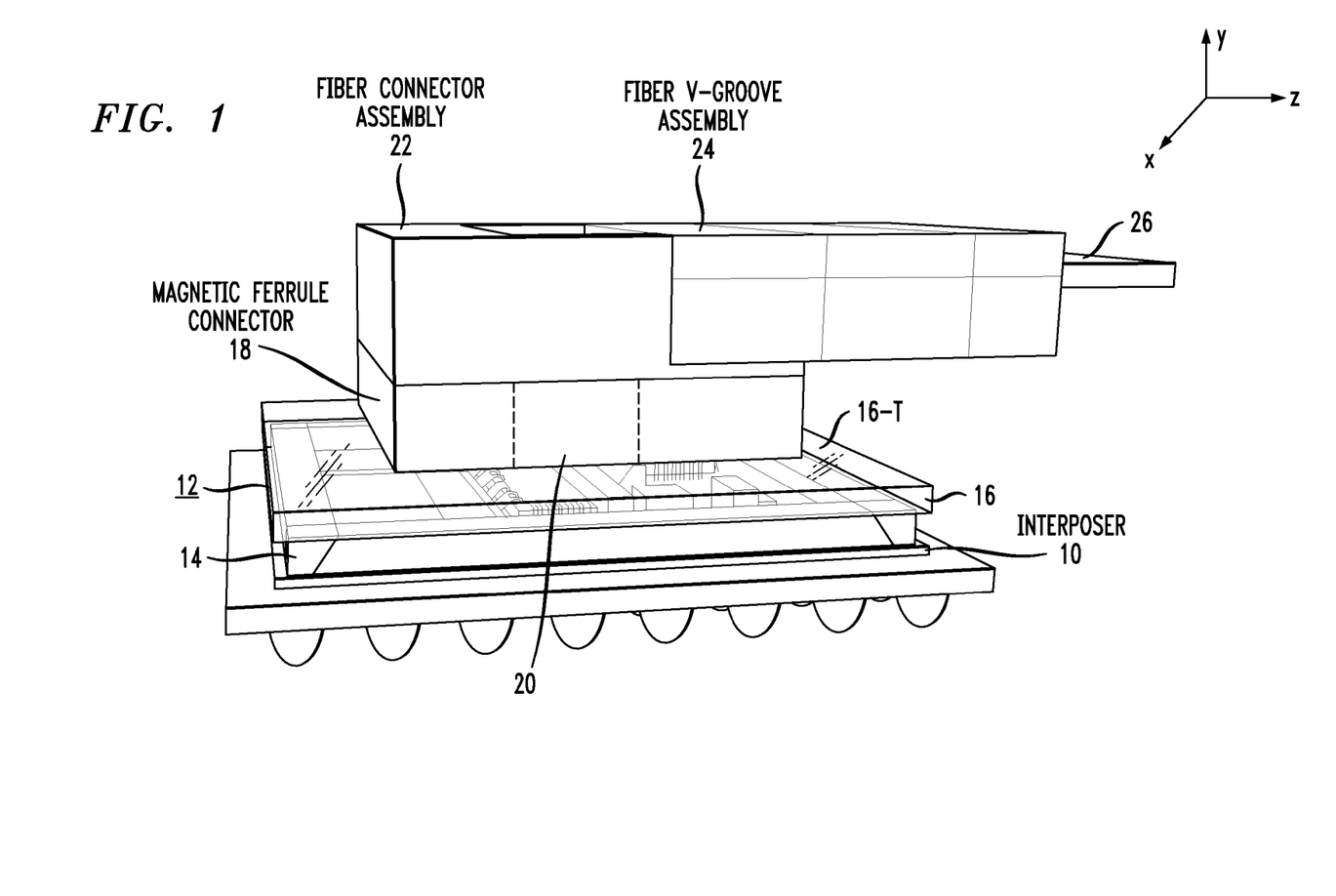
FIG. 1 is an isometric view of an opto-electronic module assembly of a particular embodiment of the present invention, illustrating an interposer substrate for supporting opto-electronic devices and a releasable fiber connector including a magnetic component that is aligned with the interposer substrate.

FIG. 1 is an isometric view of an opto-electronic module assembly of a particular embodiment of the present invention, illustrating an interposer substrate for supporting opto-electronic devices and a releasable fiber connector including a magnetic connector component that is aligned with the interposer substrate. As shown in FIG. 1, the arrangement utilizes an interposer substrate 10 that may comprise any suitable material, where silicon and glass materials are conventional choices for this purpose. As will be described in detail below, interposer substrate 10 is processed to include the various optical and electrical components necessary to form a particular opto-electronic assembly (e.g., transmitter, receiver, modulator, or the like).

In this particular configuration, the opto-electronic module assembly also includes an enclosure (housing) 12, which includes a sidewall 14 and a transparent lid 16, so that the optical input and output signals can pass through the lid. In one embodiment, a glass lid can be used. In accordance with an embodiment of the present invention, a magnetic connector component 18 is attached to a top surface 16-T of transparent lid 16. Magnetic component 18, as described in detail below, contains a central opening 20 (shown in phantom in FIG. 1) that is disposed over the area where the optical signals enter/exit the opto-electronic module assembly through transparent lid 16.

A metallic fiber connector 22 attaches to magnetic component 18 in a releasable manner and, as shown, a fiber assembly 24 attaches to connector 22. Fiber assembly 24 is passively aligned to connector 22 and, similarly, fiber connector 22 passively aligns with magnetic component 18. Therefore, upon attachment of the combination of fiber connector 22 and fiber assembly 24 to magnetic component 18, a plurality of fibers 26 within fiber assembly 24 will be aligned with the optical signal paths passing through transparent lid 16. In the particular embodiment shown in FIG. 1, the combination of fiber connector 22 and fiber assembly 24 includes a 45° turning mirror (discussed below in association with later figures) that redirects the optical signals passing through transparent lid component 16 (along the y-axis direction for the orientation shown in FIG. 1) into the plane of optical fibers 26 (along the z-axis direction for the orientation shown in FIG. 1).

Figure 2:
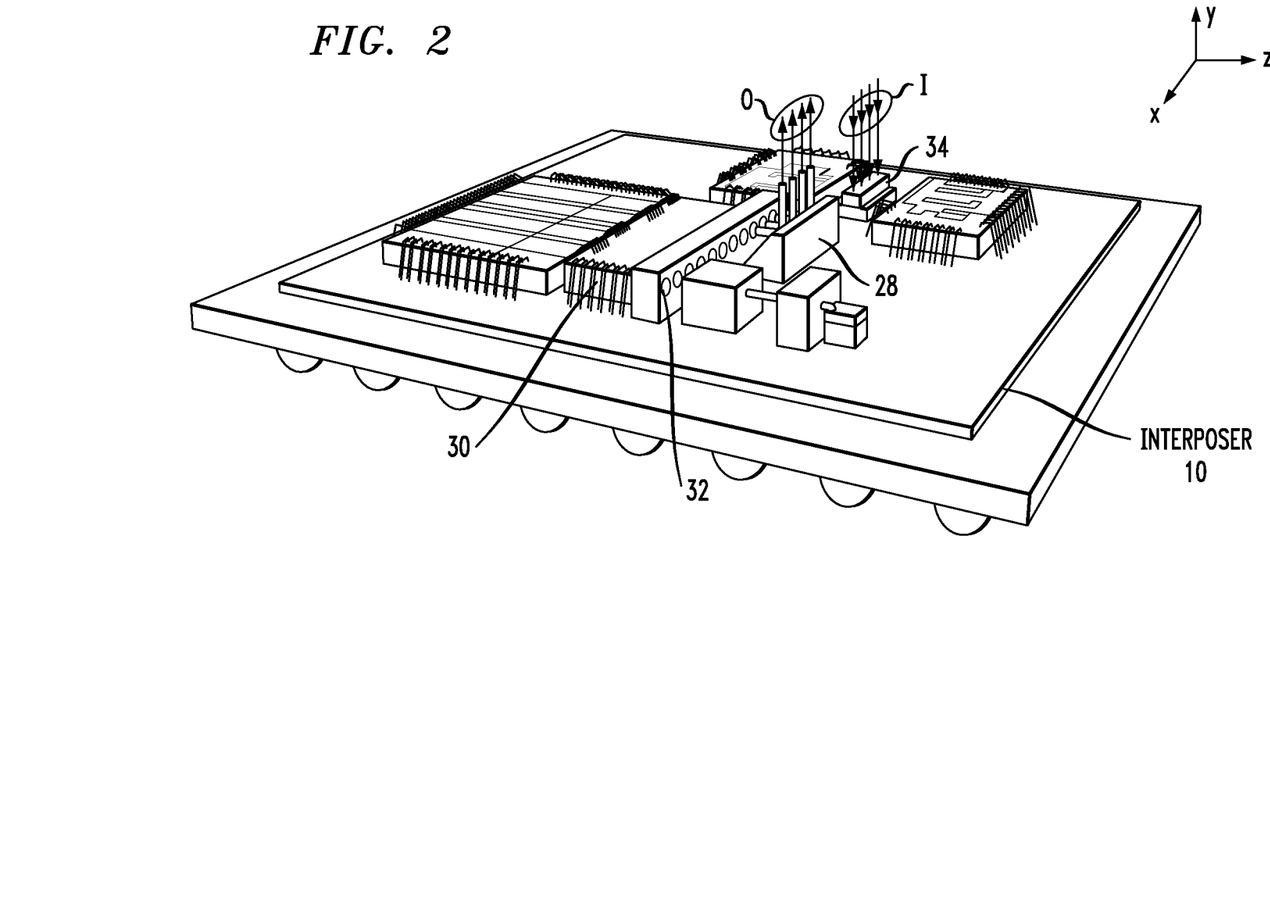
FIG. 2 is an isometric view of the interposer of FIG. 1, with an enclosure and the remaining elements of the releasable fiber connector removed.

FIG. 2 is an isometric view of the interposer of FIG. 1, with the enclosure and the remaining elements of the releasable fiber connector removed. As evident in this view, a plurality of output optical signals O created by the opto-electronic components disposed on interposer 10 is directed upward, along the y-axis of this particular orientation. This orientation is achieved by using a 45° turning mirror 28 on interposer 10 to re-direct a plurality of output optical signals created by a combination of an optical communication circuit 30 and a lens array 32 (in combination with other components including, for example, an optical source such as a laser).

In this particular embodiment, a plurality of input optical signals I is shown as directed downward along the y-axis of the system and entering a plurality of photodiodes 34 disposed at a predetermined location on interposer 10. In accordance with the principles of this disclosure, the optical signal paths associated with optical fibers 26 (not shown in this view) are to be aligned with these input optical signals I and output optical signals O. More particularly, the embodiments of the present invention as described herein provide a releasable fiber connection arrangement where alignment is maintained as the fiber connector is detached from, and re-attached to, interposer 10.

Figure 3:
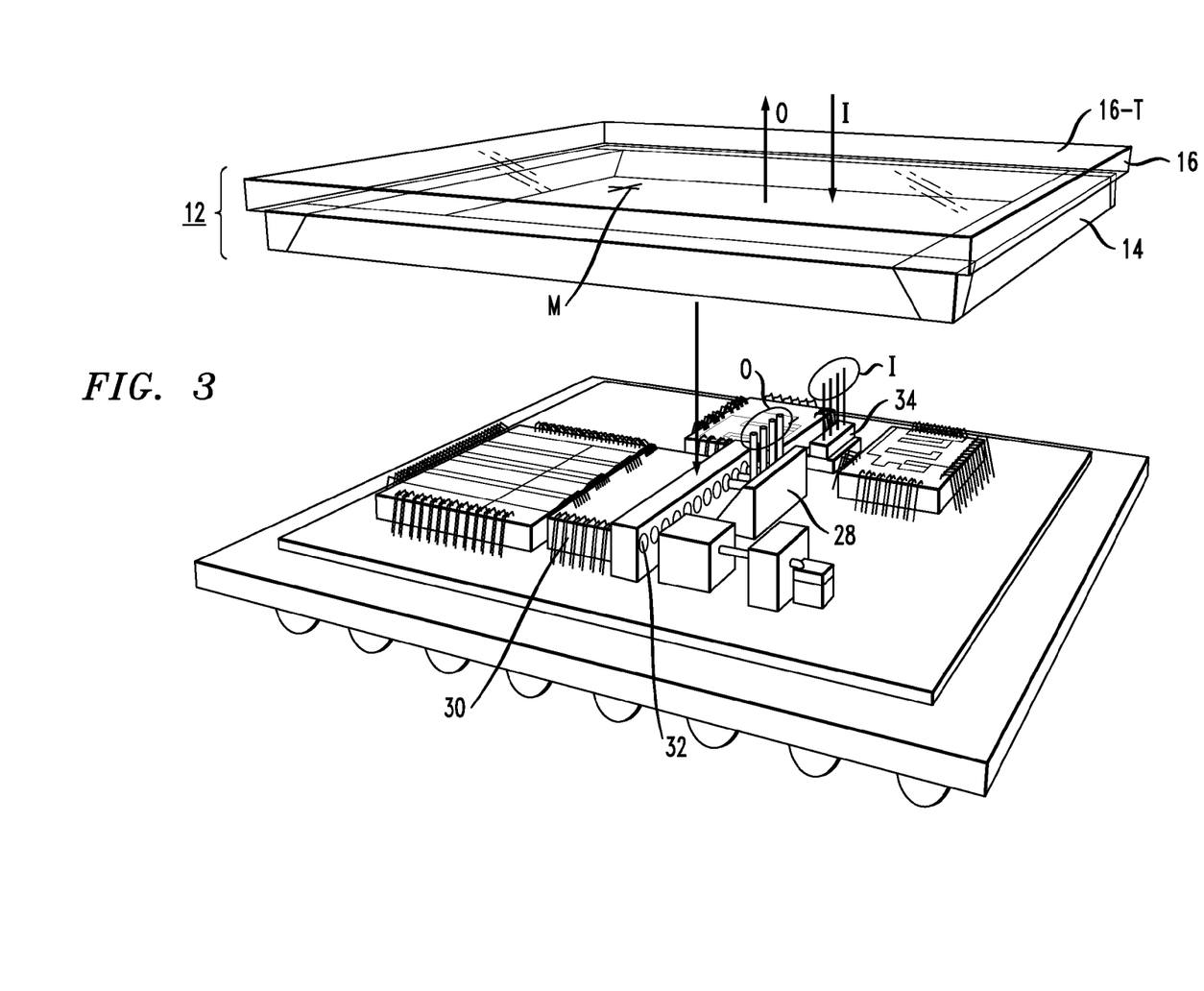
FIG. 3 illustrates both the interposer and lid assemblies, indicating the direction used to attach the enclosure to the interposer.

FIG. 3 illustrates both the interposer and enclosure components, indicating the direction used to attach the lid to the interposer. In particular, FIG. 3 shows interposer 10 and enclosure 12, with enclosure 12 shown above interposer 10 and indicating the direction used to attach enclosure 12 to interposer 10. As mentioned above, transparent lid 16 of enclosure 12 comprises a suitable material (such as glass) so that the optical signals (shown as "I" and "O") pass through unimpeded.

A fiducial marking M is also shown on transparent lid 16. As will be described below, this fiducial marking may be used to perform a visual alignment between the enclosed interposer and the releasable fiber connector in accordance with one embodiment of the invention.

Figure 4:
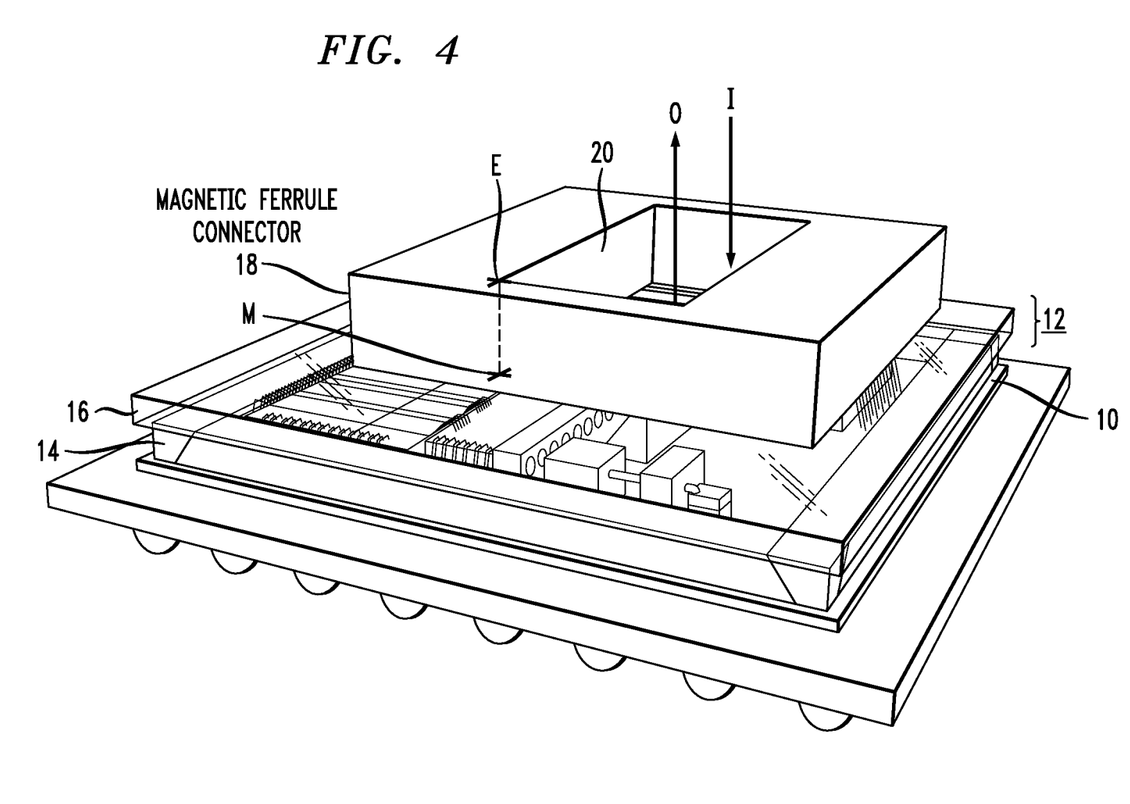
FIG. 4 shows an arrangement where a magnetic connector component has been aligned with and attached to an opto-electronic subassembly.

FIG. 4 shows an arrangement where a magnetic connector component has been aligned with and attached to an opto-electronic subassembly. In particular, FIG. 4 illustrates magnetic connector component 18 as attached to top surface 16-T of transparent lid 16. In one embodiment, a visual alignment technique may be used to properly place magnetic connector component 18 with respect to the optical signal paths exiting interposer 10; that is, to ensure that optical signals I and O pass through opening 20 in magnetic connector component 18 in the desired location that will ultimately align with optical fibers 26 (not shown).

In one visual alignment system, a known fiducial point on magnetic connector component 18 (for example, a corner edge E) is positioned to align with fiducial marking M formed on transparent lid 16 of enclosure 12. Various techniques are known in the art to accomplish this alignment, particularly on a wafer-scale level where a plurality of magnetic connector components is simultaneously aligned with a plurality of lids across a wafer surface. For example, a computer-controlled visual system utilizing an X-Y table upon which the interposer substrate is positioned may be used.

In an alternative to using a marking on the transparent lid, the defined location on magnetic connector component 18 (such as corner edge E) may be visually aligned with a specific device feature on interposer 10 (for example, with a known location of an edge of a lens array). Methods of performing visual alignment are well-known in the art and are not described in detail.

While visual alignment systems may be used, it is also possible to use mechanical systems to provide alignment between magnetic connector component 18 and transparent lid 16, with fiducial features formed within both components in a manner such that they interlock when alignment is achieved. Again, these mechanical methods of providing alignment are considered well-known in the art.

Referring further to FIG. 4, opening 20 in magnetic connector component 18 is shown to be formed such that input optical signals I and output optical signals O pass through unimpeded.

Figure 5:
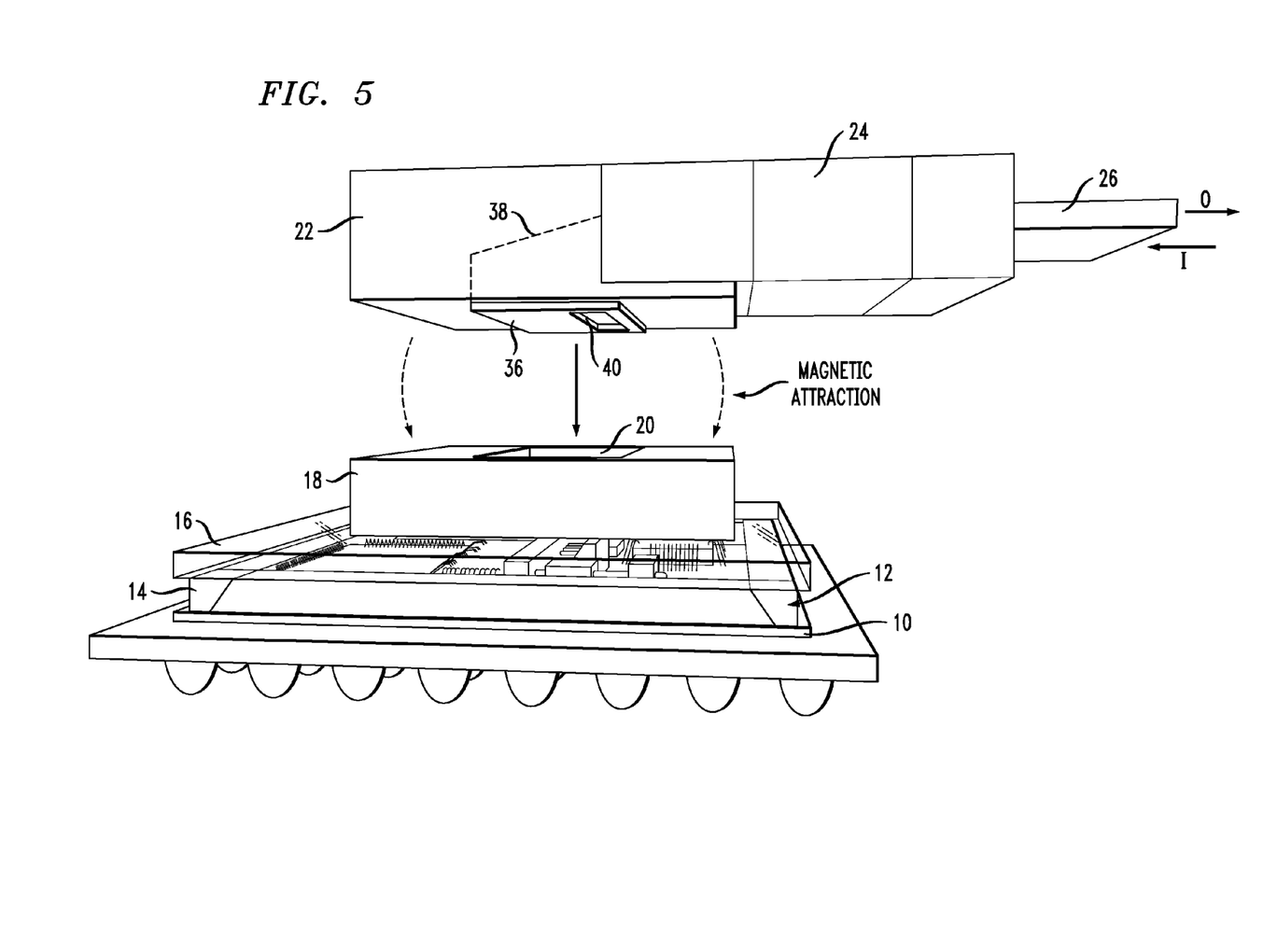
FIG. 5 shows an exemplary placement of a releasable fiber connector assembly onto an aligned magnetic component in proper position over a populated interposer substrate.

FIG. 5 shows an exemplary placement of a releasable fiber connector assembly onto an aligned magnetic connector component in proper position over a populated interposer substrate. The arrow as shown in FIG. 5 indicates the direction of placement of metallic fiber connector component 22 with respect to magnetic connector component 18 so that aligned attachment is achieved. In this illustration, fiber array assembly 24 and fiber array 26 are shown as attached to metallic fiber connector 22. Also shown in FIG. 5 (partially in phantom) is a fiber lens array 36, including a 45° turning surface 38. Turning surface 38 is used to redirect optical signals between z-axis direction of optical fibers 26 and the y-axis direction of input/output optical signals to/from interposer 10.

In accordance with this illustrated embodiment of the present invention, fiber lens array 36 is positioned within opening 20 of magnetic connector component 18 upon attachment of metallic fiber connector 22 to magnetic connector component 18. Inasmuch as fiber lens array 36 is disposed in a predefined, precise position with respect to the dimensions of metallic fiber connector 22, the individual lens elements 40 forming array 36 align with the optical signal paths upon attachment.

The attachment is releasable; that is, metallic connector 22 can be removed from magnetic connector component 18 by using a force strong enough to overcome the magnetic attraction between the components. By virtue of the aligned placement of magnetic connector component 18 and the precisely-defined relationship between opening 20 and fiber lens array 36, the attachment, removal and re-attachment of the fiber connector component (defining the "releasable" nature of this arrangement) may be repeated numerous times without affecting the optical alignment between interposer 10 and fiber array 26.

Figure 6:
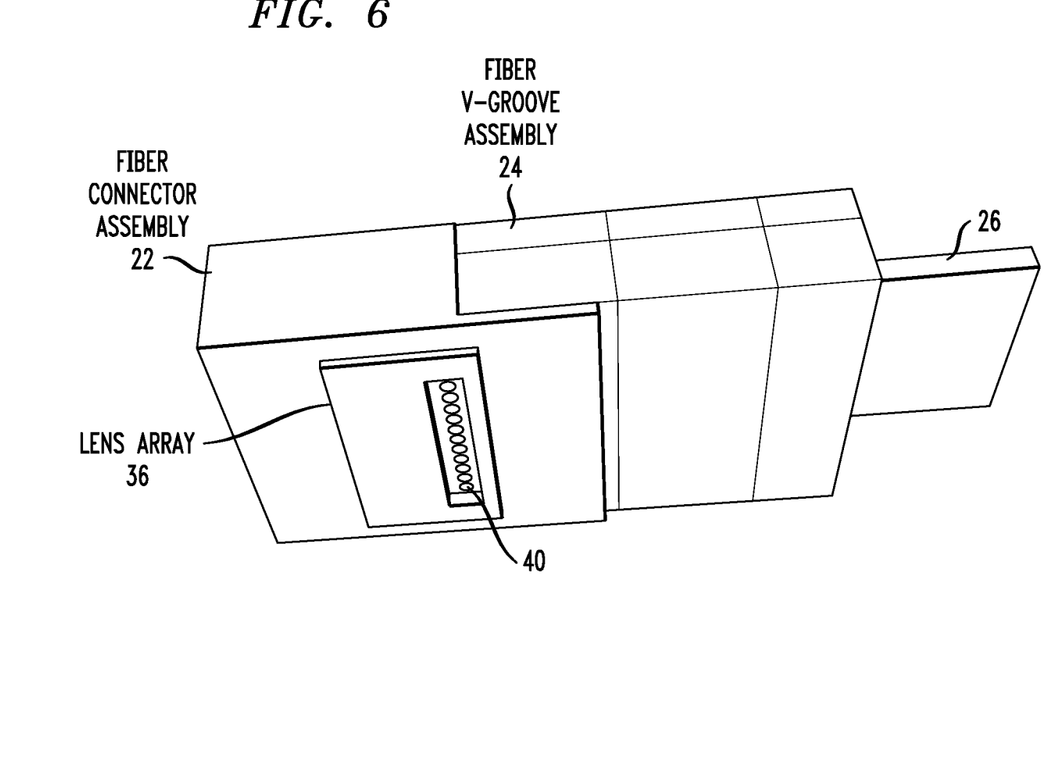
FIG. 6 is an alternative isometric view of the elements forming the releasable fiber connector.

FIG. 6 is an alternative isometric view of the components forming the releasable fiber connector, where in this view the individual lens elements 40 forming lens array 36 are clearly shown. Upon attaching metallic connector 22 to magnetic connector component 18, lens elements 40 will be disposed along the signal paths of the input and output optical signals associated with the system.

Figure 7:
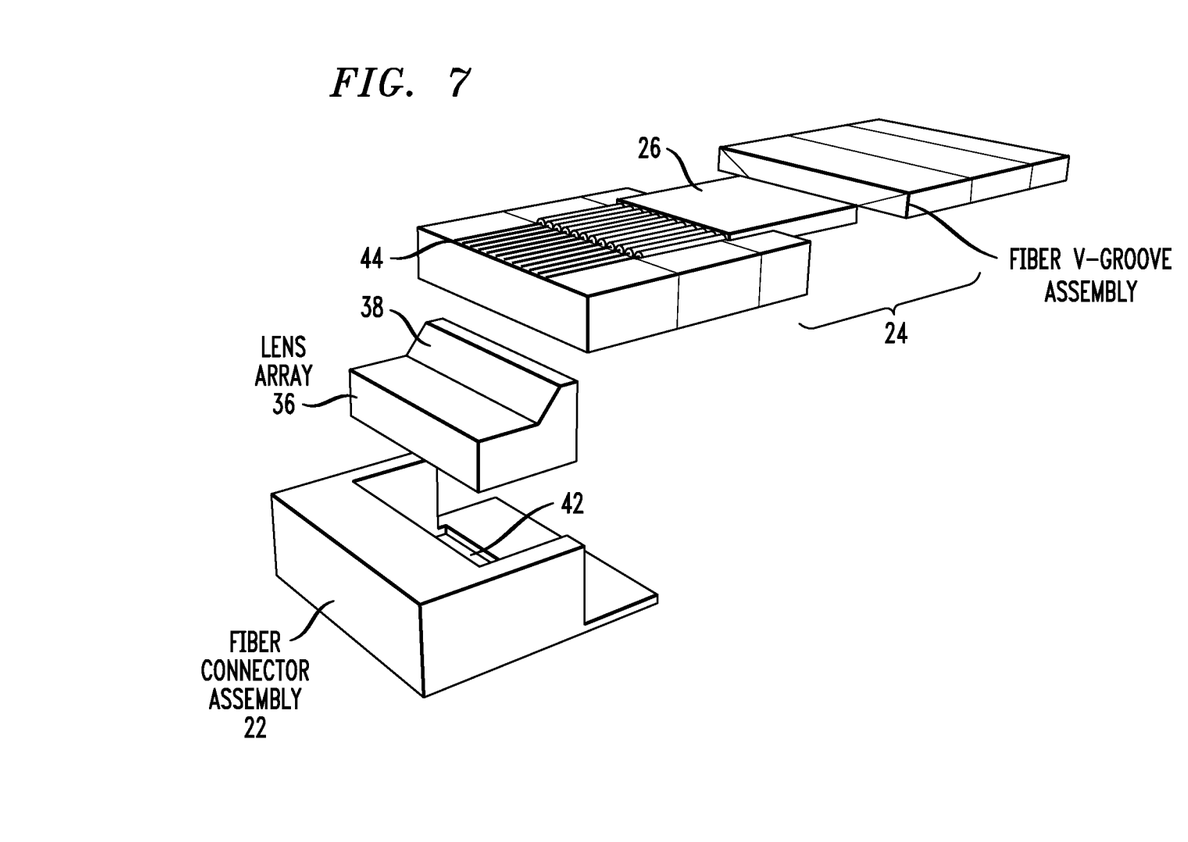
FIG. 7 is an exploded view of one possible set of individual elements that may form a releasable optical fiber connector assembly.

FIG. 7 is an exploded view of one possible set of individual components that may form a releasable optical fiber connector assembly. Metallic fiber connector 22 is shown as including an opening 42 that aligns with lens array 36 in a manner such that the individual lenses 40 (not shown in this view) are exposed to opening 20 of magnetic connector component 18 (also not shown). Turning surface 38 of lens array 36 is shown in this view. Also shown is fiber array 26, as positioned on fiber assembly 24. In the particular embodiment illustrated in this view, fiber assembly 24 includes a plurality of V-grooves 44 that are used to hold the individual fibers in predetermined positions.

Figure 8:
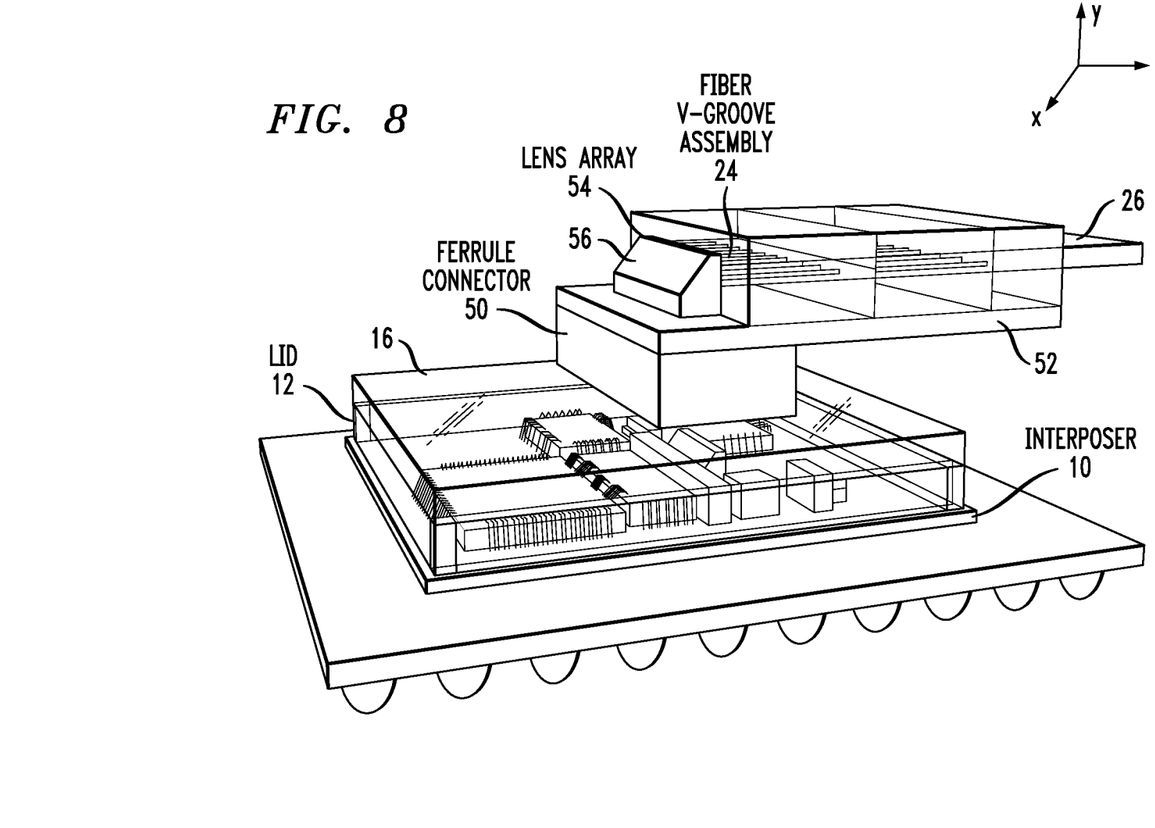
FIG. 8 illustrates another embodiment of a releasable fiber connector including a magnetic component, for use with an interposer supporting an opto-electronic assembly.

FIG. 8 illustrates another embodiment of a releasable fiber connector including a magnetic connector component, for use with an interposer supporting an opto-electronic assembly. Both interposer 10 and enclosure 12 are similar to the like elements described above. A magnetic connector component 50 is disposed over and attached to transparent lid 16, using, for example, one of the alignment techniques described above (or any other suitable alignment mechanism). A metallic fiber connector 52 is used in this example as a cantilevered platform upon which both an externally-mounted lens array 54 and fiber assembly 24 are disposed. As shown, lens array 54 includes an angled surface 56 that functions as a turning mirror between the plane of fiber array 26 and the optical signal plane of interposer 10.

Figure 9:
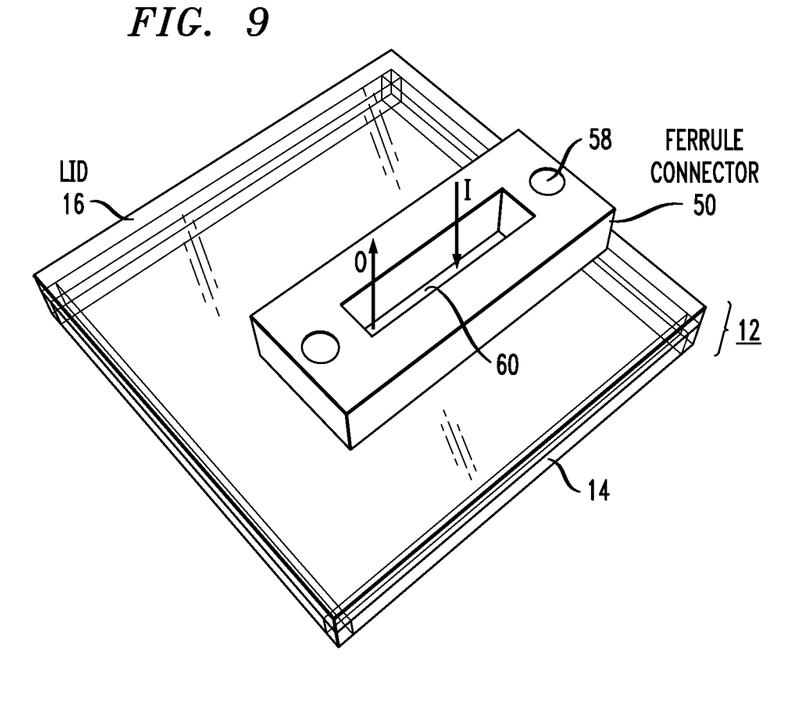
FIG. 9 is a view of the magnetic component of FIG. 8 as positioned in place on a transparent lid.

FIG. 9 is a view of the magnetic connector component of FIG. 8 as positioned in place on a transparent lid. In particular, magnetic connector component 50 is shown as including a pair of fiducial alignment apertures 58 that mate with fiducial features on a metallic fiber connector 52 upon attachment. Opening 60 in magnetic connector component 50 is also shown, where the input and output optical signal paths are illustrated within opening 60 in the form of arrows, showing the unimpeded passage of the optical signals through magnetic connector component 50.

It is presumed that magnetic connector component 50 is properly positioned in an aligned configuration with transparent lid 16 (using, for example, a visual active alignment process, a mechanical passive alignment process, or any other suitable arrangement).

Figure 10:
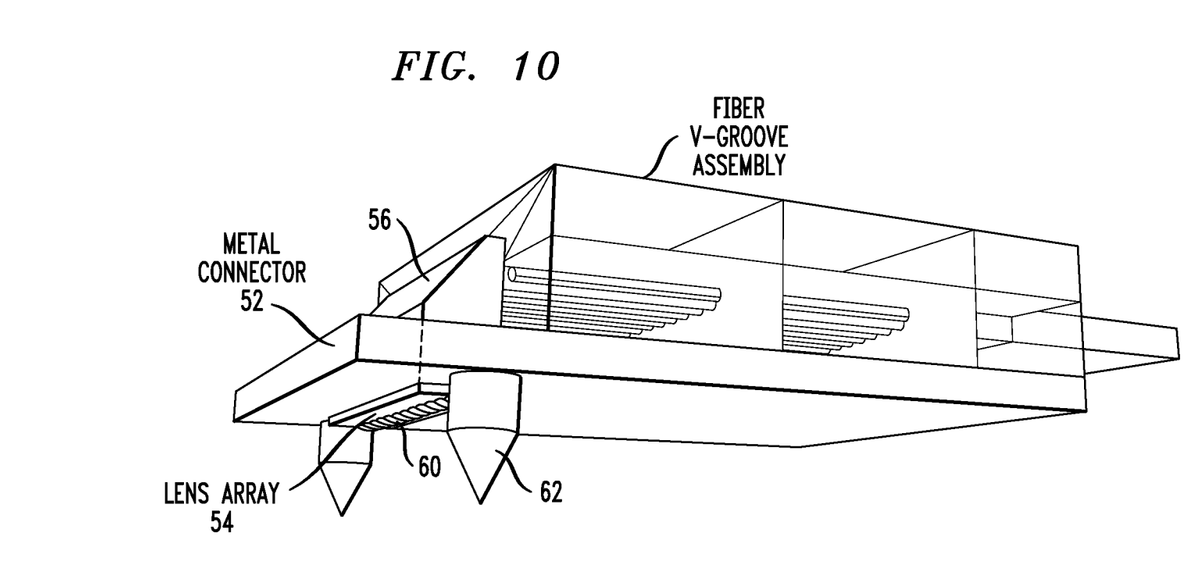
FIG. 10 is an isometric view of a particular releasable fiber connector arrangement that may be attached to the magnetic connector component as shown in FIG. 9.

FIG. 10 is an isometric view of a particular releasable fiber connector arrangement that may be attached to the magnetic connector component as shown in FIG. 9. In this particular embodiment, metallic fiber connector 52 is formed to include pair of alignment pins 62 that will mate with alignment apertures 58 of magnetic connector component 50 when metallic fiber connector 52 is brought into position over magnetic connector component 50. Also shown in this view is the plurality of individual lens elements 64 that form lens array 54, where lens elements 64 are shown as extending through the bottom surface of metallic fiber connector 52 so as to extend into opening 60 of magnetic connector component 50 and be properly aligned with the input and output optical signal paths along the y-axis direction. As mentioned above, lens array 54 includes a turning mirror surface 56 that functions to redirect the optical signal paths between the input/output plane of interposer 10 (in this case, along the y-axis direction) and the plane of fiber array 26 (in this example, along the z-axis direction).

In another embodiment of the present invention, the fiber array connector assembly is releasably attached to a sidewall of the lid component, instead of the top portion as described above. In this case, there is no need to re-direct the optical signals into an orthogonal plane; the optical axis associated with the interposer (for example, the z-axis) is the same as the optical axis associated with the fiber array.

Figure 11:
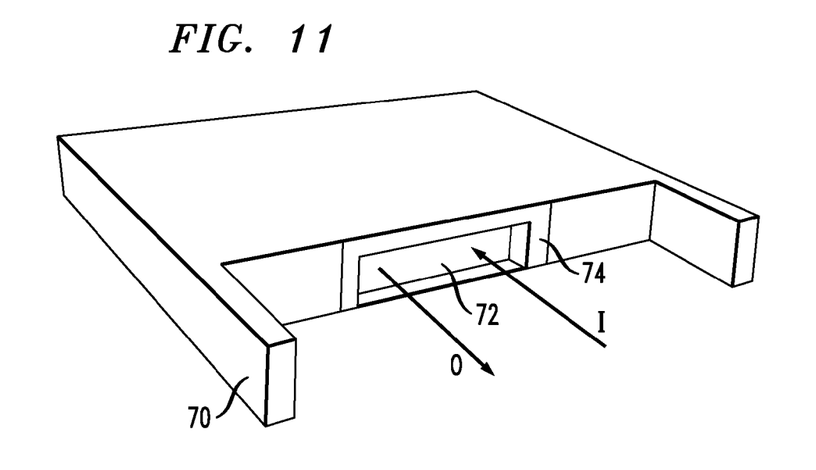
FIG. 11 illustrates an exemplary enclosure for a side-attach embodiment of the present invention.

FIG. 11 illustrates an exemplary enclosure for a side-attach embodiment of the present invention, where in this case, an enclosure 70 includes a transparent sidewall portion 72 that is used as the optical port for passing signals between the interposer and the fiber array connector. A magnetic connector component 74 is shown in this case as a U-shaped member that surrounds transparent sidewall portion 72. The input and output optical signals are shown as passing through transparent sidewall portion 72 along the z-axis direction.

Figure 12:
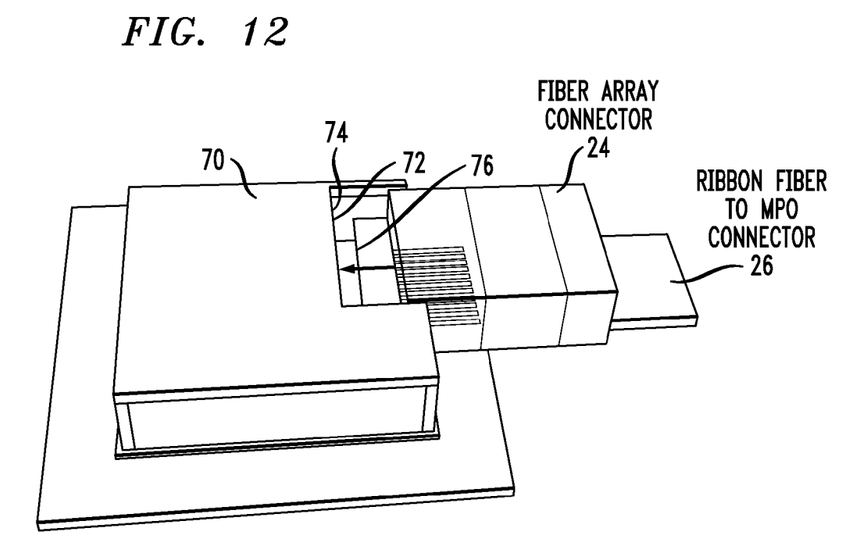
FIG. 12 illustrates the attachment of a releasable fiber array connector with the enclosure of FIG. 11

FIG. 12 illustrates the attachment of a releasable fiber array connector with the enclosure of FIG. 11. A lens array 76 is associated with fiber array 26 and is formed to include a metallic coating on at least a sidewall 78 that mates with magnetic connector component 74 upon attachment. Again, by virtue of using a magnetic force to attach the fiber array connector to the interposer, the fiber array connector can be removed and re-attached as necessary, without needing to otherwise interrupt the attachment of other components or disturb the optical alignment between the interposer and the fiber array connector.

While the invention has been described in terms of different embodiments, those skilled in the art will recognize that the invention can be practiced with various modifications that are considered to fall within the spirit and scope of the invention as best defined by the claims appended hereto. Furthermore, while the specification has been described in language specific to structural features and/or methodological acts, the claims are not limited to the features or acts described above. Rather, the specific features and acts described above are disclosed as examples for embodiments of the invention.

What is claimed is:

1. An apparatus comprising:
   an interposer substrate for supporting a plurality of opto-electronic components for creating optical output signals and receiving optical input signals;
   an enclosure including a transparent lid covering the interposer substrate, wherein the transparent lid is positioned to allow the optical output and input signals to pass through first and second surfaces of the transparent lid, wherein the first and second surfaces are parallel;
   a magnetic connector component disposed on the transparent lid, the magnetic connector component including a central opening for allowing the optical output and input signals to pass through the magnetic connector component; and
   a fiber connector for supporting one or more optical fibers and including a metallic connector component for mating with the magnetic connector component and providing releasable attachment of the fiber connector to the enclosure in a manner allowing the optical output and input signals to align with the one or more optical fiber, wherein the magnetic connector component is disposed between the transparent lid and the fiber connector.

2. The apparatus as defined in claim 1 wherein the interposer supports a first turning mirror for directing optical signals through the transparent lid and the fiber connector includes a second turning mirror for directing optical signals through the transparent lid.

3. The apparatus as defined in claim 1 wherein the enclosure includes a fiducial marking that aligns with a designated location on the magnetic connector component upon alignment of the central opening with the transparent lid.

4. The apparatus as defined in claim 1 wherein mechanical fiducial markings are used to provide alignment between the magnetic connector component and the fiber connector.

5. The apparatus as defined in claim 4 wherein the mechanical fiducial markings comprise a plurality of apertures formed on a first mating surface of the magnetic connector component and a plurality of pins formed on a second mating surface of the fiber connector wherein the pins mate with the apertures upon aligned attachment.

6. The apparatus as defined in claim 1 wherein the fiber connector is a fiber array connector supporting a plurality of optical fibers in an aligned configuration.

7. The apparatus as defined in claim 1, wherein the fiber connector comprises a lens array protruding from a surface of the fiber connector configured to contact the magnetic connector component, wherein the lens array extends into the central opening in the magnetic connector component when the fiber connector is magnetically coupled to the magnetic connector component.

8. A method, comprising:
providing an interposer substrate including a plurality of opto-electronic components for creating optical output signals and receiving optical input signals;
providing an enclosure including a transparent lid covering the interposer substrate, wherein the transparent lid comprises a first surface and a second surface through which the optical output and input signals pass through, the first and second surfaces are parallel;
providing a magnetic connector component disposed on the transparent lid, wherein a central opening of the magnetic connector component is aligned with the optical output and input signals passing therethrough; and
releasably attaching a fiber connector to the magnetic connector component, the fiber connector for supporting one or more optical fibers and including a metallic connector component for magnetically adhering to the magnetic connector component in a manner where the optical output and input signals align with the one or more optical fibers, wherein, when attached to the fiber connector, the magnetic connector component is disposed between the transparent lid and the fiber connector.

9. The method of claim 8 further comprising:
positioning the magnetic connector component onto the transparent lid using a visual alignment system.

10. The method of claim 9 wherein the visual alignment system utilizes a fiducial material formed on the transparent lid and a known edge location of the magnetic connector component to achieve alignment.

11. The method of claim 9 wherein the visual alignment system utilizes a known edge location of an element disposed on the interposer substrate and a known edge location of the magnetic connector component to achieve alignment.

12. The method of claim 9 wherein the positioning is performed by using a mechanical alignment system.

13. The method of claim 8 wherein the fiber connector is attached to the magnetic connector component using a mechanical alignment system comprising a plurality of alignment apertures formed on a top surface of the magnetic connector component and a plurality of alignment pins formed on a bottom surface of the fiber connector.

14. A system for providing releasable attachment between an opto-electronic subassembly and a fiber array connector, the system comprising:
a magnetic connector component disposed on a first surface of a transparent lid component of the opto-electronic subassembly, the transparent lid comprising a second surface that is parallel to the first surface and is arranged in the opto-electronic subassembly to at least one of receive and transmit an optical signal; and
a metallic connector element formed as part of the fiber array connector, wherein the metallic connector element mates with the magnetic connector component when brought into proximity thereof, the metallic connector element being releasable from the magnetic connector component upon application of a force sufficient to overcome the magnetic attachment, wherein, when attached to the fiber array connector, the magnetic connector component is disposed between the transparent lid and the fiber array connector.

15. The system of claim 14 wherein the transparent lid includes a fiducial marking that aligns with a designated location on the magnetic connector component upon alignment of the magnetic connector component with the transparent lid.

16. The system of claim 14 wherein the magnetic connector component includes a plurality of alignment apertures and the metallic connector includes a plurality of alignment pins, where the pins mate with the apertures upon aligned attachment of the metallic connector to the magnetic connector component.

17. The system of claim 14, wherein the fiber array connector comprises a lens array protruding from a surface of the fiber array connector configured to contact the magnetic connector component, wherein the lens array extends into a central opening of the magnetic connector component when the fiber array connector is magnetically coupled to the magnetic connector component.

* * * * *